United States Patent [19]

Reynolds et al.

[11] 4,102,131

[45] Jul. 25, 1978

[54] INTEGRATED TRANSMISSION-ENGINE CONTROL

[75] Inventors: David W. Reynolds, Huxley; Frederic W. Pollman, Ames, both of Iowa

[73] Assignee: Sundstrand Corporation, Rockford, Ill.

[21] Appl. No.: 794,094

[22] Filed: May 5, 1977

[51] Int. Cl.² .................. F16D 31/02; F15B 11/02
[52] U.S. Cl. .................. 60/431; 60/433; 60/443; 60/449
[58] Field of Search .................. 60/423, 431, 433, 434, 60/443, 444, 449; 74/687, 868

[56] References Cited

U.S. PATENT DOCUMENTS

| | | | |
|---|---|---|---|
| 2,500,580 | 3/1950 | Segsworth | 60/433 |
| 2,882,743 | 4/1959 | Ebert | 74/472 |
| 3,114,424 | 12/1963 | Voreaux et al. | 180/6.3 |
| 3,139,723 | 7/1964 | Hollowell | 60/433 |
| 3,237,398 | 3/1966 | Croswhite | 60/433 |
| 3,733,931 | 5/1973 | Nyman et al. | 74/868 |
| 3,855,793 | 12/1974 | Pollman et al. | 60/431 |

*Primary Examiner*—Edgar W. Geoghegan
*Attorney, Agent, or Firm*—Wegner, Stellman, McCord, Wiles & Wood

[57] ABSTRACT

An integrated transmission-engine control for a transmission, such as a hydrostatic transmission having a variable displacement unit connectable to an engine and a second displacement unit connected to an output shaft, including fluid pressure-operated ratio governor means for the transmission, fluid pressure-operated means for controlling the supply of fuel to an engine, a power demand valve for converting a particular power demand to a particular fluid pressure primary control signal. The primary control signal is applied to the ratio governor means in opposition to a signal representing engine speed to set the transmission ratio for a desired engine speed and also applied to the fuel supply controlling means to establish a fuel setting to match engine horsepower to engine speed for minimum fuel consumption.

22 Claims, 4 Drawing Figures

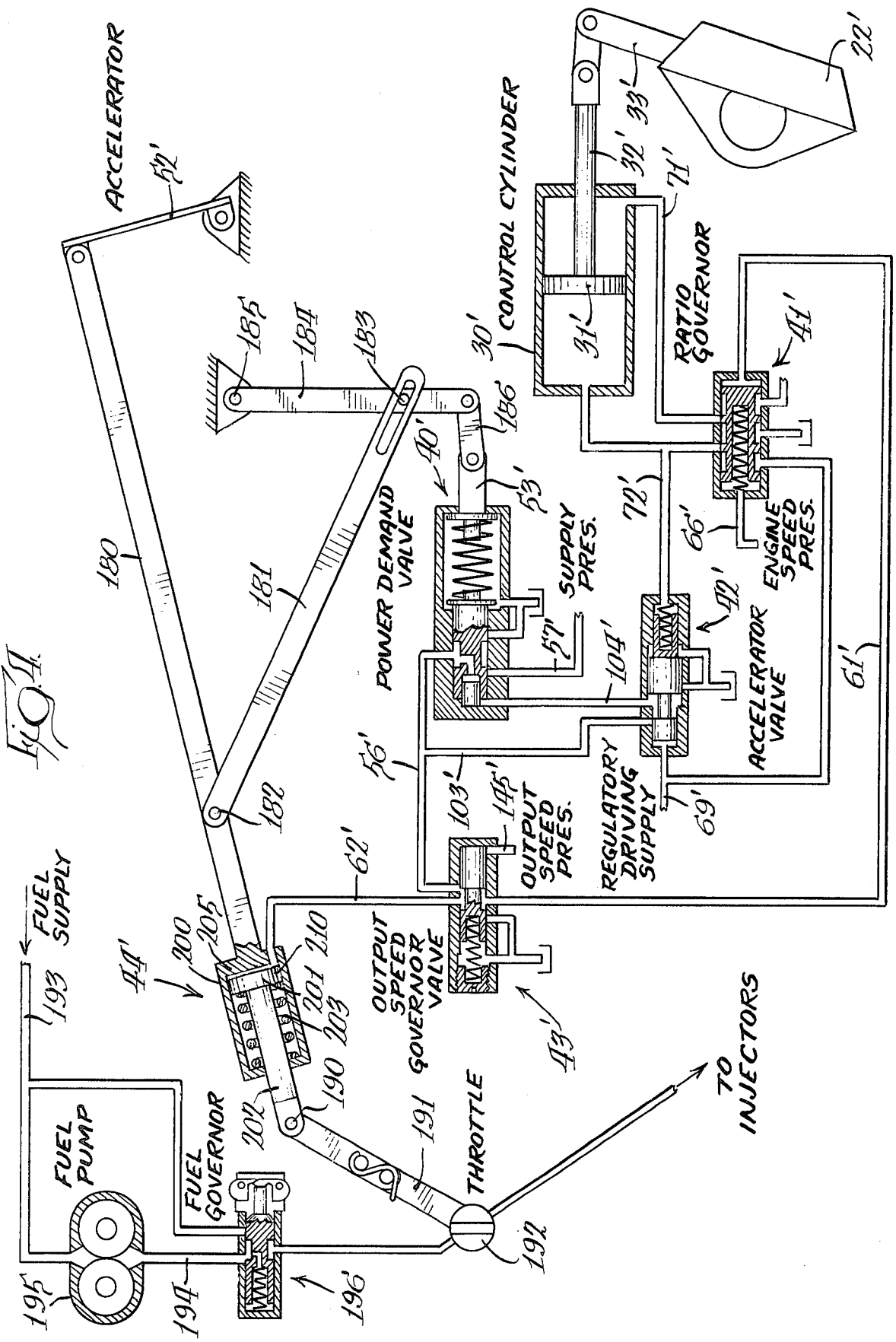

INTEGRATED TRANSMISSION-ENGINE CONTROL

BACKGROUND OF THE INVENTION

This invention pertains to an integrated transmission-engine control wherein the transmission controls engine speed and is integrated with the control of supply of fuel to the engine for matching engine horsepower and transmission-governed engine speed to optimize fuel consumption and with the integrated controls using fluid pressure signals.

Many different types of controls for engines and transmissions driven thereby are known in the prior art wherein an effort is made to have the engine operate with minimum fuel consumption. The assignee of this application has U.S. Pat. No. 3,855,793 which describes one type of control system and refers to prior devices. The system disclosed in the patent provides for an operator to set engine horsepower by the supply of fuel to the engine and with the transmission ratio being adjusted to have the engine speed operate at the given horsepower and at a particular speed as governed by the transmission for minimum fuel consumption.

The Croswhite U.S. Pat. No. 3,237,398 discloses a control system which reduces engine horsepower by means of lowering engine speed (on the lug curve) with a transmission ratio change in order to limit working pressure. The system is used primarily as a pressure control and not an engine speed control and there is no provision for decreasing fuel to the engine.

The prior art includes various types of acceleration controls to limit acceleration at start-up. However, none are known which control both fuel supply and transmission ratio.

SUMMARY OF THE INVENTION

A primary feature of the invention disclosed herein is to provide a relatively simple method of integrating a transmission control system to an engine fuel control system in order to operate at minimum fuel consumption and to accomplish this both under the direction of an operator as well as under automatic override control conditions.

Additional features of the invention are to provide an integrated transmission-engine control which interrelates the control of engine speed and engine fuel supply with automatic override controls to limit and control engine speed and horsepower under start-up and low-speed conditions, such as when used in a vehicle, regardless of the demand signal of an operator in order to reduce smoke, noise and improve fuel economy, without significantly reducing tractive effort.

Additionally, the maximum transmission output speed is controlled in order to limit vehicle speed while maintaining minimum fuel consumption and without the use of conventional engine overspeed limiters which are uneconomical in operation.

The foregoing features are accomplished without changing the engine emission control system to avoid increased emissions and without causing high engine power levels in the event of transmission system malfunction.

In carrying out the foregoing features of the invention, the integrated transmission-engine control is associated with a transmission having a variable displacement unit responsive to a transmission ratio signal and with engine fuel supply controlling means. A power demand valve provides a fluid pressure primary control signal responsive to operator demand to signal the horsepower demand and which operates through transmission ratio governor means to establish a transmission ratio and set a transmission-governed engine speed and to signal the fuel supply controlling means to vary the fuel supplied to the engine, whereby engine horsepower and transmission-governed engine speed are matched to optimize fuel consumption.

An additional object of the invention is to provide acceleration valve means for modifying a fluid pressure control signal on start-up to limit engine speed and horsepower by application of the control signal to a first means which sets transmission ratio and a second means which establishes a fuel setting to an engine. More particularly, the acceleration valve means is in circuit with a power demand valve and a transmission ratio governor means and is responsive to a transmission ratio setting pressure signal and a regulated control pressure to act on the power demand valve to modify a primary control signal and limit engine speed and horsepower on start-up of the transmission and engine.

Yet another object of the invention is to provide output speed governor means responsive to a predetermined transmission output speed to reduce the fuel supplied to the engine and to change the transmission ratio to reduce engine speed by modifying a control signal which functions to set transmission ratio and to establish a fuel setting for an engine. More specifically, the output speed governor means includes a valve in circuit with a power demand valve and responsive to a pressure signal representative of transmission output speed for modifying a fluid pressure primary control signal provided by the power demand valve.

An additional object of the invention is to provide an integrated transmission-engine control wherein the control of the fuel supplied to the engine and of the transmission ratio is by means of a power demand valve which sets a fluid pressure primary control signal with the capability of having acceleration valve means for modifying the power demand primary control signal in order to limit engine speed and horsepower on start-up, and output speed governor means to modify the horsepower demand signal in order to limit engine speed and limit maximum vehicle speed. The controls for setting fuel level are part of an interface of the transmission to the engine and with the fuel control accomplished either by the primary control signal effecting a component of a collapsing throttle linkage or a control valve associated with an engine aneroid device. In either case, operation is only in a direction to lower fuel supply whereby the existing emission control systems are not disturbed and a transmission control system malfunction will not dangerously affect engine operation.

DESCRIPTION OF THE DRAWINGS

FIG. 4 is a diagrammatic illustration of an alternate embodiment of the integrated transmission-engine control with a different form of fuel supply controlling means.

DESCRIPTION OF THE PREFERRED EMBODIMENTS

Figure 1:
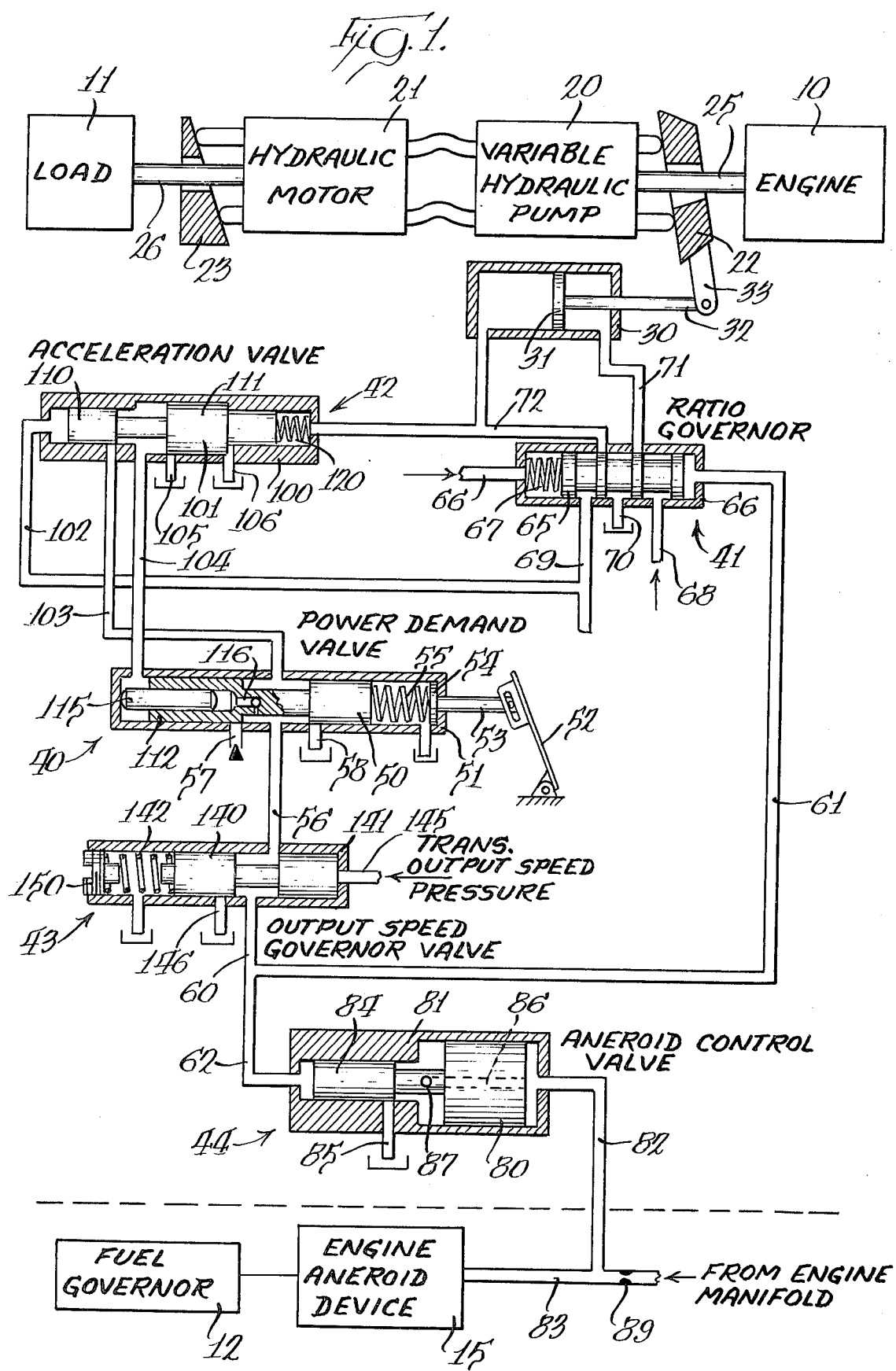
FIG. 1 is a diagrammatic illustration of an integrated transmission-engine control embodying the principles of the present invention in association with a turbocharged diesel engine.

One embodiment of the invention is shown in FIG. 1, wherein a transmission is associated with an engine 10 and connected to a load 11, such as the wheels of a vehicle, when the transmission is used with a vehicle. In the embodiment shown, the engine 10 is illustratively shown as a turbocharged diesel engine having a fuel governor 12 and an engine aneroid device 15 for controlling fuel supply and, more particularly, described hereinafter.

The transmission is shown as a hydrostatic transmission having a variable displacement unit 20 connected hydraulically to a second displacement unit, such as a fixed displacement motor 21. As known in the art, the variable displacement unit can be an axial piston pump having an adjustably-mounted swash plate 22 for controlling the displacement of the pump and with the motor 21 being an axial piston unit with a swash plate 23 at a fixed angle.

The transmission ratio of the hydrostatic transmission is controlled by the positioning of the adjustable swash plate 22 and the resulting transmission ratio controls the speed of the engine 10. The engine 10 is drivingly connected to the pump 20 by means of a connecting shaft 25 and the motor 21 is connected to the load 11, such as a vehicle axle, by means indicated by a shaft 26.

The transmission ratio is set by the positioning of the angle of the swash plate 22 by a displacement control motor 30 having a piston 31 connected by a link 32 to an arm 33 operatively connected to the swash plate 22.

The primary elements of the integrated transmissionengine control include power demand means in the form of a power demand valve, indicated generally at 40; ratio governor means in the form of a ratio governor, indicated generally at 41; acceleration valve means in the form of an acceleration valve, indicated generally at 42; and output speed governor means including an output speed governor valve, indicated generally at 43; and fuel supply controlling means, indicated generally at 44 and shown as an aneroid control valve.

The power demand valve 40 has a valve member 50 movable in a bore, shown as defined by a casing 51, and is positionable in response to an operator's positioning of an accelerator pedal 52 through a connecting member 53 and a plunger 54 acting on the valve member 50 through a spring 55 to establish a fluid pressure primary control signal in a line 56. The power demand valve is connected to a source of fluid pressure at a line 57, such as supplied by a charge pump driven by the engine and there is a drain connection 58 whereby a pair of spaced lands on the valve member 50 control the degree of connection between the inlet pressure port 57 and the drain connection 58 to set the valve of the primary control signal in the line 56. This primary control signal is a signal indicating the horsepower demand and is applied to the ratio governor means 41 and the fuel supply controlling means 44. The primary control signal in line 56 is delivered through the output speed governor valve 43 to a line 60 with a branch line 61 extending to the ratio governor 41 and a branch line 62 extending to the fuel supply controlling means 44.

The ratio governor 41 has a multi-land valve member 65 in a bore as defined by a casing 66. The valve member 65 is acted upon at one end by the primary control signal delivered hereto through the line 61 and, at the opposite end, is acted upon by a pressure signal indicative of engine speed through a line 66. This engine speed pressure signal may be derived from a flyweight controlled valve which has the flyweight rotatable by the engine as well known in the art. The valve member 65 is urged toward the right, as viewed in FIG. 1, by a spring 67. The ratio governor 41 is supplied with charge pump pressure through a line 68 and also has a line 69 connected to a source of regulator pressure which supplies regulated pressure. The structure for supplying regulated pressure may be in the form of the pressure regulator valve 132 shown in FIG. 5B of U.S. Pat. No. 3,733,931, owned by the assignee of this application. It is a characteristic of the referred to pressure regulator valve that the output pressure thereof is zero when the engine is at idle speed and, as the engine increases in speed, there is an output pressure from the pressure regulator valve. The ratio governor additionally has a drain port 70.

The pair of central lands of the ratio governor valve member 65 controls the fluid connections to a pair of lines 71 and 72 which lead to opposite ends of the displacement motor 30 whereby positioning of the ratio governor valve member 65 establishes the position of the piston 31 and, therefore, the angle of the swash plate 22. Assuming a certain angle of the swash plate 22, as the primary control signal in line 61 reduces to a lower value the ratio governor valve member 65 moves to the right and operates to increase the transmission ratio setting pressure in line 72 and, thus, increase the angle of the swash plate to increase the transmission ratio and reduce the speed of the engine 10. Correspondingly, an increase in the primary control signal, from a reduced value, will reduce the transmission ratio setting pressure in line 72 and result in a reduced angle of the swash plate 22 to reduce the transmission ratio and cause an increase in engine speed.

The fuel supply controlling means 44 is shown as an aneroid control valve having a valve member 80 with differing diameter lands mounted in a two-diameter bore of a casing 81 and with one end of the valve having a line 82 connected to an engine manifold pressure line 83 which extends to the engine aneroid device 15. The primary control signal in line 62 is applied against an end of the valve land 84 for controlling the position of the valve member 80 and, thus, controlling the connection of the line 82 to a bleed port 85. This communication is through a passage 86 in the valve member which opens to an end thereof and extends through the central part of the valve member to an opening 87 which opens to the valve bore and which may communicate with bleed port 85, depending upon the position of the valve land 84. In the example given of a turbo-charged diesel engine, the engine aneroid device 15 is known to function as a fuel-reducing unit to limit fuel to the engine if intake manifold pressure from the turbo-charger is low. This results in keeping the air-to-fuel mixture closer to optimum and decreases smoke. The aneroid control valve 44 decreases fuel by lowering the engine manifold pressure signal to the engine aneroid device 15 by bleeding manifold pressure in the line 83 when the primary control signal in line 62 lowers. An orifice 89 in the line 83 ahead of the line 82 prevents lowering of the actual manifold pressure at the engine 10. This system results in modifying the existing engine signal only in the direction to lower fuel supply and, thus, the existing emission control systems are not disturbed and a transmission control system malfunction will not dangerously affect engine operation.

Figure 2:
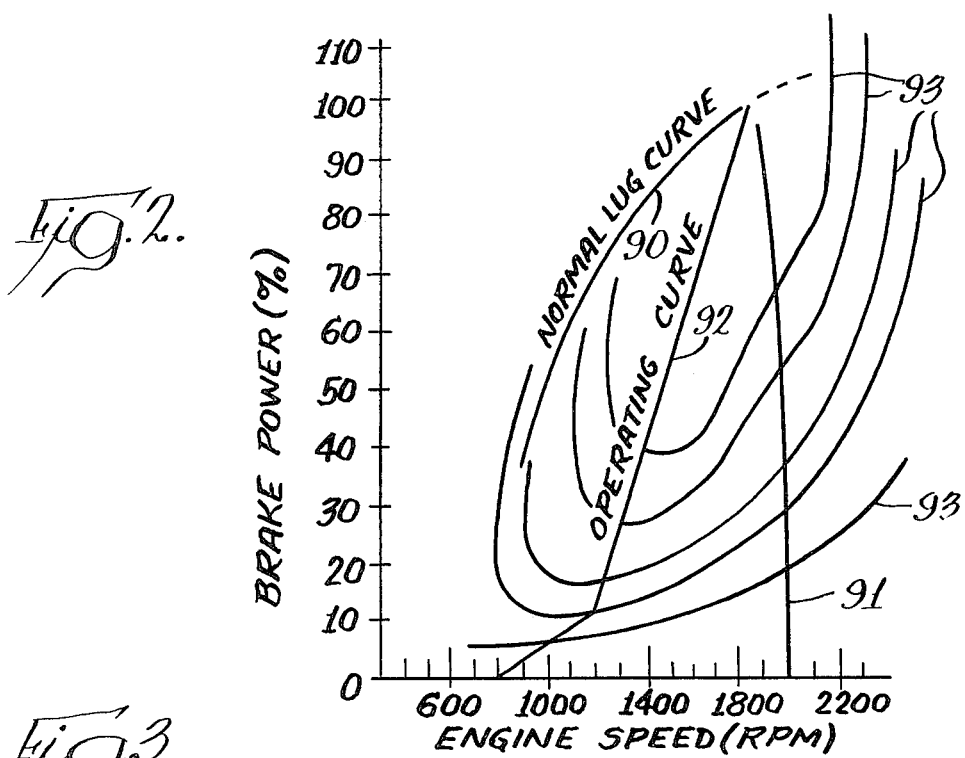
FIG. 2 is a graph plotting brake power against engine speed and showing typical engine performance characteristics.

With the control as now described, the power demand valve converts the horsepower demand of the operator to a primary control signal which is used to signal the transmission ratio governor 41 as to the desired engine speed by setting the transmission ratio and also to signal the fuel supply controlling means 44 to maintain the proper amount of fuel in reference to the operator's position of the accelerator pedal 52. This results in an integrated transmission-engine control which integrates the transmission control with the control of fuel to the engine in order to operate at minimum fuel consumption. This action is shown in the graph of FIG. 2 which shows typical engine performance characteristics. A line 90 shows the normal lug curve of an engine and a line 91 shows a typical performance with a conventional engine overspeed governor operation to be referred to more particularly hereinafter. The operating curve with the control disclosed herein is indicated by the line 92. A number of lines 93 show various values of fuel consumption at various power and speed levels for the engine, with the innermost line representing the lowest value of fuel consumption. The control disclosed herein modifies the fuel setting in order to match engine horsepower and transmission-governed engine speed to optimize fuel consumption and operate along the line 92.

The acceleration valve 42 modifies the primary control signal in order to limit engine speed and horsepower on start-up. Unlike torque converters, hydrostatic transmissions require only a small fraction of maximum power to develop full torque at stall or low ground speeds. This acceleration control is effective, regardless of operator demand signal applied to the accelerator pedal 52 and operates to reduce smoke, noise and improve fuel economy without significantly reducing tractive effort.

The acceleration valve 42 compares the transmission ratio setting pressure in line 72 with the value of regulated pressure in line 69. The transmission ratio controlling pressure is directed to one end of a valve casing 100 which movably mounts a valve member 101 and applied against an end thereof and the regulated supply pressure is applied against the other end of the valve member 101 through a line 102.

The acceleration valve 42 has a line 103 connected thereto which delivers the primary control signal set by the power demand valve to the bore of the acceleration valve and a line 104 which extends from the bore of the acceleration valve to a chamber at an end of the power demand valve 40. Additionally, the acceleration valve has a pair of drain ports 105 and 106. The valve member 101 has a pair of lands 110 and 111 which operate to receive the primary control signal delivered to the acceleration valve and derive therefrom a feedback signal which, through line 104, is applied to an end 112 of the power demand valve member 50. The area of the power demand valve member against which the feedback signal is applied is reduced by means of a pin 115 mounted within a bore in the valve member 50 and with the inner end of the bore having passage means 116 opening to the central part of the bore of the valve for draining of fluid. The valve member 101 of the acceleration valve is normally urged toward the left by means of a spring 120 to interconnect the primary control signal line 103 with the feedback signal line 104.

When the transmission is governing, the transmission ratio control pressure is less than the regulated supply pressure. If transmission ratio control pressure approaches the value of the regulated supply pressure, a shift of the acceleration valve member 101 occurs to increase the feedback signal in line 104 to the power demand valve and resultingly cause a decrease in the value of the primary control signal in line 56. The lowered value of the primary control signal will result in not allowing full fuel to the engine because of the control of the fuel supply controlling means 44 and result in adjustment of the ratio governor 41 to increase the transmission ratio control signal to increase the transmission ratio and cause a reduction in engine speed. The decrease in fuel to the engine results in a decrease in horsepower.

If engine speed is too low, the ratio governor moves to the left, which reduces the transmission ratio control signal. The reduced transmission ratio control signal decreases the transmission ratio by decreasing the angle of the swash plate. The lowering of the value of the transmission ratio control pressure acts at the acceleration valve 42 whereby the valve member 101 may shift to the right to lower the value of the feedback signal in line 104 applied to the power demand valve member. This results in increase in value of the primary control signal in line 56 with the application thereof to the fuel supply controlling means 44 increasing the fuel supply to the engine and causing a reduction in the transmission ratio.

Figure 3:
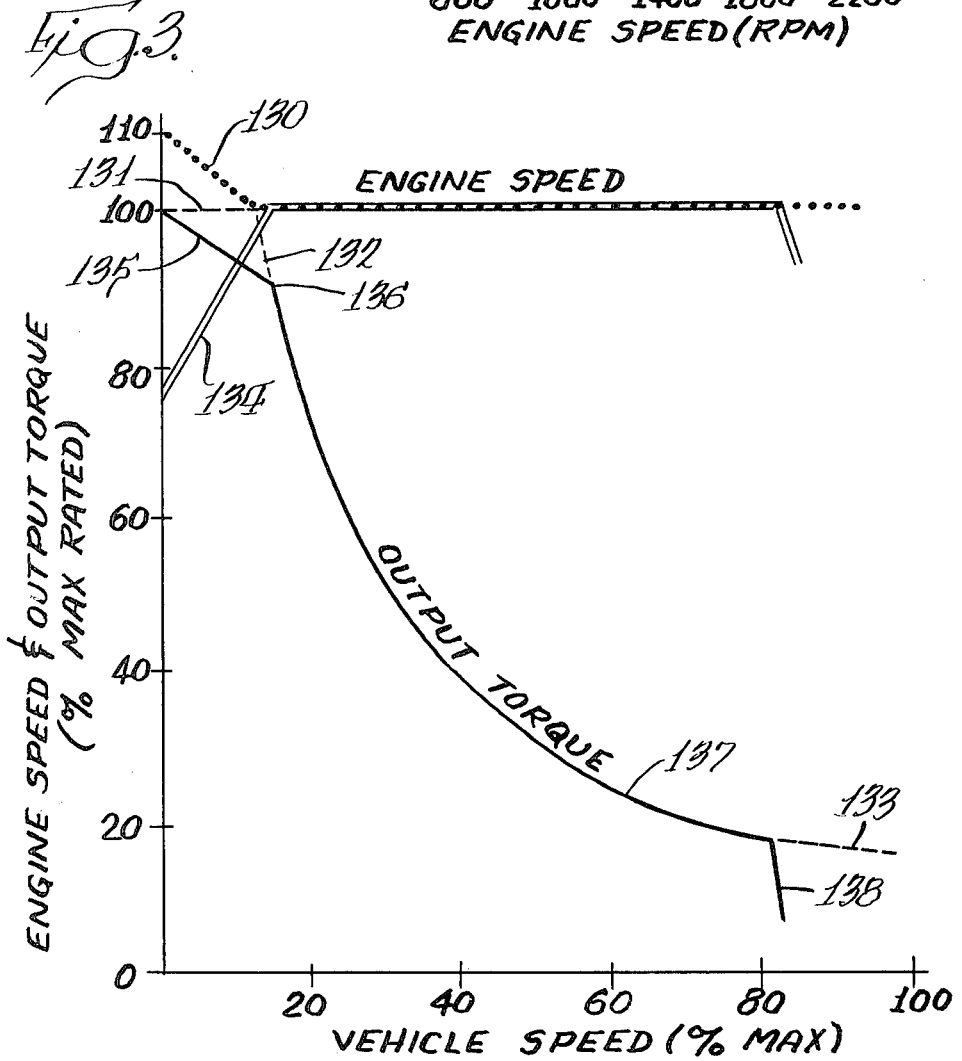
FIG. 3 is a graph plotting engine speed and output torque against vehicle speed and showing normal acceleration characteristics at start-up and the varying characteristics with the acceleration valve control disclosed herein.

The operation of the control is shown in the graph of FIG. 3 with engine speed and output torque being plotted by dotted line 130 and broken line 131, respectively, when the control does not have the acceleration valve 42. The dotted line 130 shows engine speed wherein at start-up engine speed exceeds the maximum rated speed and then lowers to full maximum rated speed. Output torque, without the acceleration valve 42, is shown by the broken line 131 which initially is shown extending horizontally at 100% and then descends along a curved line 132 which, for a major part of its length, is coincident with a solid line to be described and which diverges therefrom in a line section identified at 133. The value of horizontal line 131 is maximum stall torque.

With the control including the acceleration valve 42, engine speed is shown by a double line 134 which shows at start-up that engine speed is less than maximum rated speed and, as vehicle speed increases, the engine speed increases and joins the engine speed dotted line 130. Output torque with the acceleration valve 42 is represented by a solid line having a section 135 with a downward slope to a point 136 which represents maximum engine horsepower at rated engine speed and with a line section 137 curving downwardly and diverging from line 132 to have a line section 138. The last line section 138 is derived from the output speed governor valve 43 to be described.

The output speed governor valve 43 functions to modify the horsepower demand signal in order to limit engine power and, thus, limit maximum vehicle speed. This valve has a valve member 140 movable within a bore in a casing 141 and urged to the right by a spring 142 with the valve member having a pair of lands to control the value of the primary control signal in line 56 as delivered therefrom to the line 60. The valve member 140 is positioned in response to a pressure signal representing transmission output speed and applied through a line 145 to an end of the valve spool and acting in opposition to the spring 142. The transmission output speed pressure may be derived from a flywheel-operated valve connected to be driven by the output shaft 26. The pressure signal applied through line 145 is a function of the output speed of the transmission and when a set transmission output speed pressure is reached, the valve member 140 is shifted to the left to make a partial connection to a drain port 146 and reduce the value of the primary control signal. The decrease in the primary control signal functions to increase the transmission ratio to reduce transmission-governed engine speed and decreases the fuel supplied to the engine which limits engine power to limit maximum vehicle speed. The force of the spring 142 can be varied by adjustment of a threaded member 150 in order to establish a setting for the transmission output speed governor valve into operation. Alternatively, the adjustment provided by the threaded member 150 can be provided through a remote control operable from the cab of the vehicle. An important advantage of the output speed governor is that it is not necessary to gear a vehicle to run uneconomically on the engine overspeed governor in order to limit maximum vehicle speed. The uneconomical nature of the operation on the engine overspeed governor is shown by the line 91 in the graph of FIG. 2. With the output speed governor valve 43 in the control, the operation is along the line 92 of FIG. 2 and line 138 of FIG. 3.

An alternate embodiment of the invention is shown in FIG. 4, with the alternate embodiment having the same primary control elements and showing a different interfacing of the transmission to the engine by use of a fuel control embodying the use of a collapsing throttle linkage. The structural elements of FIG. 4 that are the same as disclosed in FIG. 1 have been given the same reference numeral with a prime affixed thereto.

The accelerator 52' has a linkage system for operating the engine fuel control and the power demand valve 40'. A main link 180 is pivotally connected to the accelerator and has a link 181 pivoted thereto intermediate its ends at 182. The link 181 has a pin and slot connection 183 to a link 184 having one end pivoted at 185 to a fixed point and an opposite end pivotally connected to an intermediate link 186 which connects to an operating member 53' of the power demand valve. Through the linkage described, movement of the accelerator pedal 52' results in operation of the power demand valve 40' similarly to the action of the accelerator pedal 52 in the embodiment of FIG. 1.

The main link 180, through parts to be described, has an end pivotally connected at 190 to a "break over" link 191 which is connected to a throttle 192 positionable to set the fuel supply to an engine. The fuel is derived from a supply line 193 and caused to flow through a line 194 to the throttle and engine by means of a fuel pump 195 and with there being a fuel governor 196 connected in the line 194. The main link 180 includes a piston and cylinder structure with the cylinder 200 fixed to the major part of the main link and a piston 201 connected to a rod 202 which, in effect, defines an end of the main link 180 which is pivotally connected at 190 to the "break over" link 191. The piston 201 is urged toward the right-hand end wall 205 of the cylinder 200, as viewed in FIG. 4, by a spring 203 and the piston 201 may be positioned at variable distances from the wall 205 to vary the effective length of the main link 180 and, therefore, the position of the throttle 192 by the pressure value of the primary control signal applied to the piston through a line 62' which extends from the output speed governor valve 43'. The piston 201 has a small flow passage 210 therethrough in order to permit any fluid leaking past the piston 201 into the spring chamber to flow therethrough and prevent blocking of piston movement to the left.

In the embodiment of FIG. 4, the collapsing linkage and, particularly, the fluid-operated piston and cylinder associated therewith defines the fuel supply controlling means 44' for effecting the position of the throttle 192. In the embodiment of FIG. 4, the actions of the various components of the control are the same as described in the embodiment of FIG. 1, wherein the primary control signal existing in lines 61' and 62' is effective to operate on the ratio governor 41' and the fuel supply controlling means 44' to obtain the interrelated action between transmission-governed engine speed and fuel supply to the engine to operate at minimum fuel consumption by a matching of engine horsepower and transmission-governed engine speed. Similarly, to the fuel supply controlling means of FIG. 1, a reduction in the primary control signal applied to the fuel control supplying means 44' operates only in a direction to reduce fuel supplied to the engine whereby the existing emission control systems are not disturbed and a transmission control system malfunction will not dangerously affect engine operation.

We claim:

1. An integrated transmission-engine control including a transmission having a pump drivable by an engine, a fluid pressure operated ratio governor means for the transmission, fluid pressure operated means for controlling the supply of fuel to an engine, a power demand valve for converting a particular power demand to a particular fluid pressure primary control signal, and means for applying said primary control signal to the ratio governor means in opposition to a signal representing engine speed to set the transmission ratio to establish engine speed and to the fuel supply controlling means to establish a fuel setting to match engine horsepower to engine speed for minimum fuel consumption.

2. A control as defined in claim 1 including acceleration valve means responsive to the transmission ratio governor means to modify said primary control signal applied to both the ratio governor means and the fuel supply controlling means and resultingly limit and control engine speed and horsepower at start-up and low transmission output speed.

3. A control as defined in claim 2 wherein said ratio governor means includes a valve connected to a pressure-regulated source of fluid pressure and operable to set a ratio control pressure for setting the ratio of the transmission, and said acceleration valve means is acted upon by both said pressure-regulated source and the ratio control pressure in opposition and has a fluid signal output acting on said power demand valve.

4. A control as defined in claim 1 including an output speed governor responsive to the output speed of the transmission to modify said primary control signal when a set transmission speed is reached to reduce the fuel supplied to the engine and modify the transmission ratio to reduce engine speed.

5. A control as defined in claim 4 wherein said output speed governor includes a valve connected between the power demand valve and the ratio governor means, the speed governor valve being urged to one position by adjustable spring means and having means responsive to a transmission output speed fluid signal for movement in opposition to said spring means.

6. A control as defined in claim 1 including adjustable means for supplying fuel to an engine including means responsive to an engine manifold pressure signal, and the fuel supply controlling means including a valve responsive to said primary control signal for modifying said engine manifold pressure.

7. A control as defined in claim 6 wherein said means responsive to engine manifold pressure includes an engine aneroid device.

8. A control as defined in claim 1 wherein said means for controlling the supply of fluid to an engine includes a throttle, and a mechanical linkage for positioning said throttle including means responsive to the value of said primary control signal for adjusting the effective action of said linkage.

9. A control as defined in claim 8 wherein the means of said mechanical linkage includes a piston and cylinder with a spring acting on the piston and the primary control signal being applied in opposition thereto.

10. An integrated transmission-engine control for a hydrostatic transmission having a variable displacement unit connectable to an engine and a displacement unit connected to an output shaft and said engine having adjustable fuel supply means comprising, a power demand valve for converting an operator's accelerator command to a fluid pressure primary control signal, ratio governor means to control said variable displacement unit to set the transmission ratio to set engine speed, fuel supply controlling means for controlling said adjustable fuel supply means to establish engine horsepower, and means for directing said primary control signal to both said fuel supply controlling means and the ratio governor means to match engine horsepower to engine speed for minimum fuel consumption.

11. A control as defined in claim 10 including acceleration valve means responsive to the transmission ratio governor means to modify said primary control signal applied to both the ratio governor means and the fuel supply controlling means and resultingly limit and control engine speed and horsepower at start-up and low transmission output speed.

12. A control as defined in claim 11 wherein said ratio governor means includes a valve connected to a pressure-regulated source of fluid pressure and operable to set a ratio control pressure for setting the ratio of the transmission, and said acceleration valve means is acted upon by both said pressure-regulated source and the ratio control pressure in opposition and has a fluid signal output acting on said power demand valve.

13. A control as defined in claim 10 including an output speed governor responsive to the output speed of the transmission to modify said primary control signal when a set transmission speed is reached to reduce the fuel supplied to the engine and modify the transmission ratio to reduce engine speed.

14. A control as defined in claim 13 wherein said output speed governor includes a valve connected between the power demand valve and the ratio governor means, the speed governor valve being urged to one position by adjustable spring means and having means responsive to a transmission output speed fluid signal for movement in opposition to said spring means.

15. A control as defined in claim 10 wherein said adjustable fuel supply means is responsive to engine manifold pressure, and said fuel controlling means includes a valve to vary said engine manifold pressure.

16. A control as defined in claim 10 including a mechanical linkage for operating said adjustable fuel supply means and said linkage including a device responsive to the primary control signal to vary the length of said linkage.

17. An integrated transmission-engine control having a first means responsive to a fluid pressure control signal to set transmission ratio, a second means responsive to said fluid pressure control signal to establish a fuel setting to an engine, and acceleration valve means for modifying said control signal on start-up to limit engine speed and horsepower.

18. A control as defined in claim 17 wherein said acceleration valve means is controlled by opposed fluid pressure signals representative of the degree of ratio governor modulation.

19. A integrated transmission-engine control having a first means responsive to a fluid pressure control signal to set transmission ratio, a second means responsive to said fluid pressure control signal to establish a fuel setting to an engine, and output speed governor means for modifying said control signal in response to a predetermined transmission output speed to reduce the fuel supplied to the engine and to change the transmission ratio to reduce engine speed.

20. An integrated transmission-engine control as defined in claim 19 wherein said output speed governor means includes a valve, adjustable means urging said valve in one direction, and a pressure signal representing transmission output speed acting on the valve in opposition to said urging means.

21. An integrated transmission-engine control for a system having a hydrostatic transmission with a variable displacement unit connectable to an engine having adjustable fuel supply means and a second displacement unit connectable to an output shaft comprising, a ratio governor means including a first valve for setting a pressure signal for establishing a transmission ratio to set engine speed, fluid pressure responsive means for controlling said adjustable fuel supply means to establish engine horsepower, power demand means including a second valve for establishing a fluid pressure primary control signal applied to said first and second valves to match engine horsepower to engine speed, acceleration valve means for comparing a pressure with the pressure set by said first valve for modifying the action of said second valve, and output speed governor means including a third valve responsive to transmission output speed for modifying said primary control signal.

22. An integrated transmission-engine control as defined in claim 21 wherein said first valve is connected to a regulated pressure source for supplying fluid for said transmission ratio pressure signal and said first valve is acted upon by said primary control signal in opposition to a pressure signal representing engine speed.

* * * * *

UNITED STATES PATENT AND TRADEMARK OFFICE
CERTIFICATE OF CORRECTION

PATENT NO. : 4,102,131
DATED : July 25, 1978
INVENTOR(S) : David W. Reynolds, Huxley; Frederic W. Pollma: Ames, both of Iowa It is certified that error appears in the above-identified patent and that said Letters Patent are hereby corrected as shown below:

Claim 1, line 32, column 8, before "transmission" insert --variable ratio--.

Claim 21, line 49, column 10, after "first" insert --valve--;
same line, delete "second" and substitute therefor --said fluid pressure responsive means--;
line 50, delete "valves"

Signed and Sealed this

Twelfth Day of May 1981

[SEAL]

Attest:

RENE D. TEGTMEYER

Attesting Officer     Acting Commissioner of Patents and Trademark·